United States Patent Office 2,974,472
Patented Mar. 14, 1961

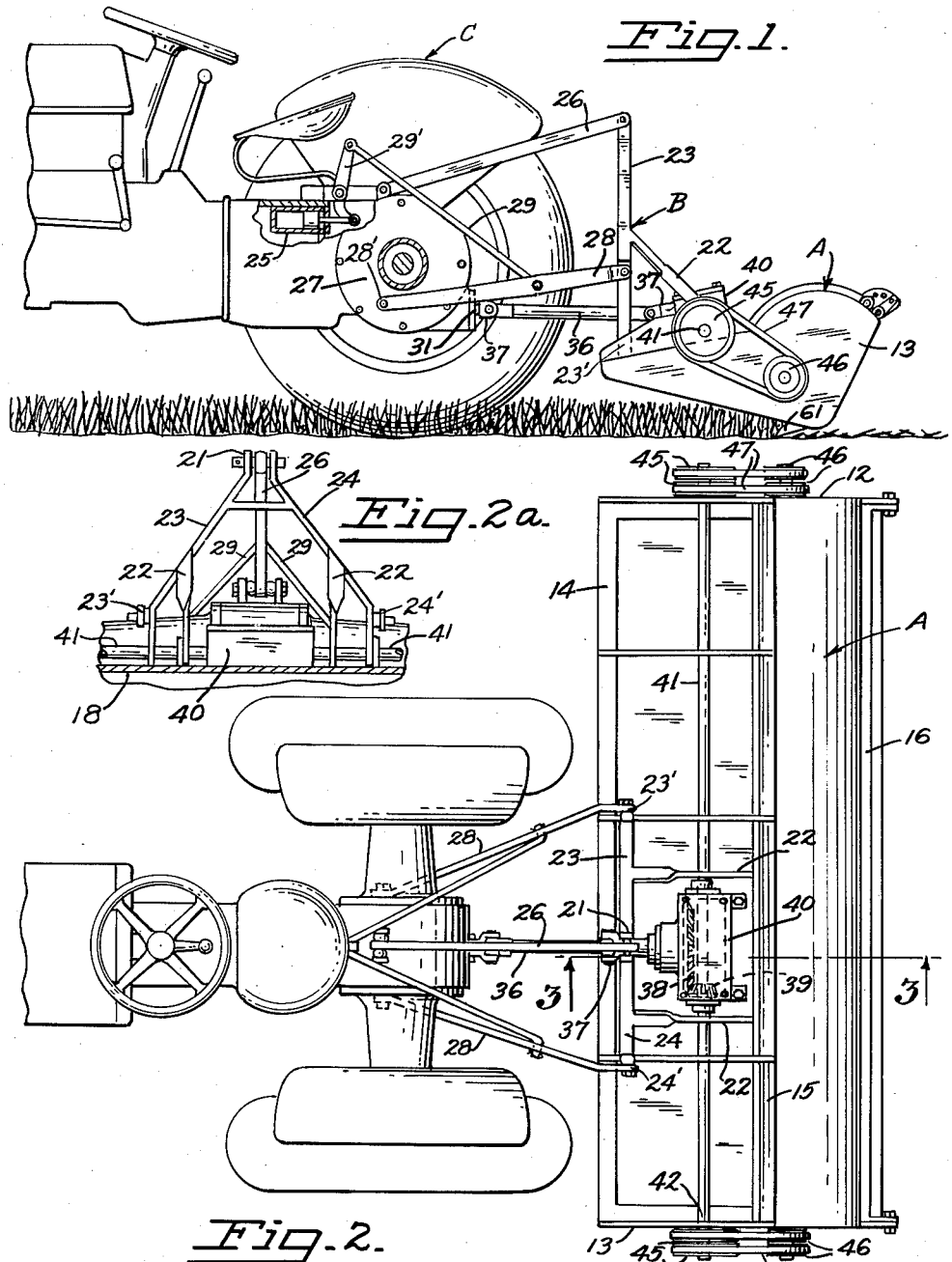

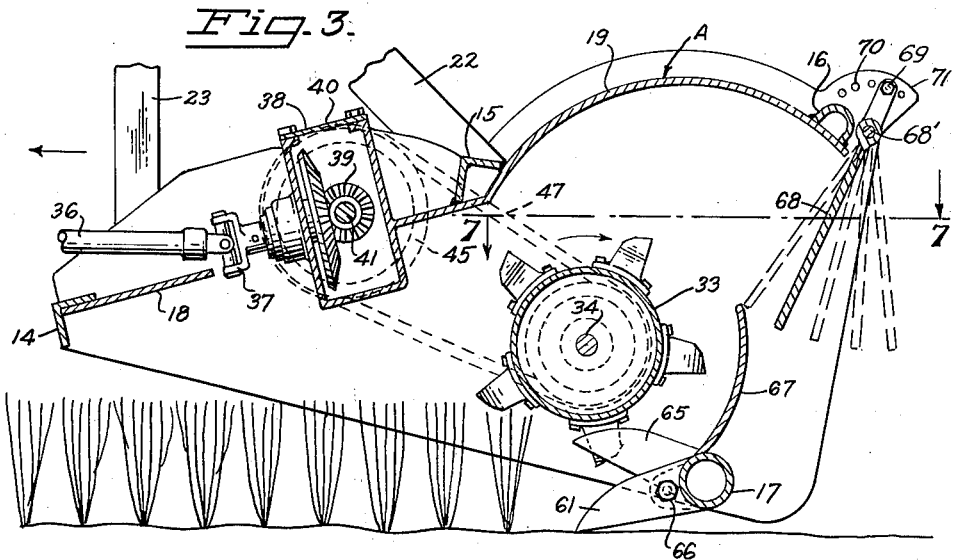
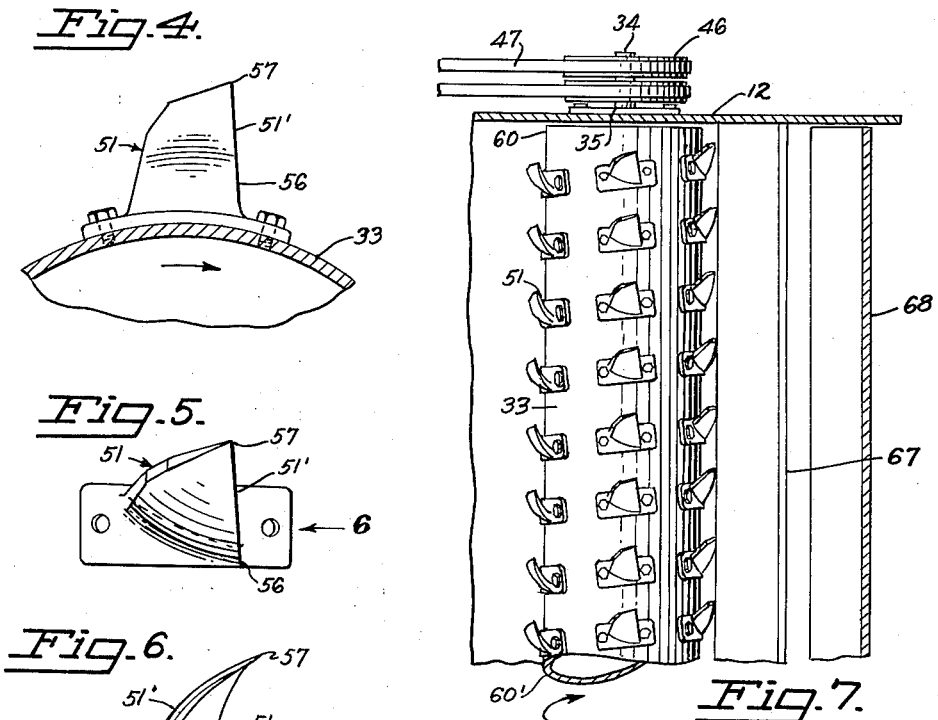

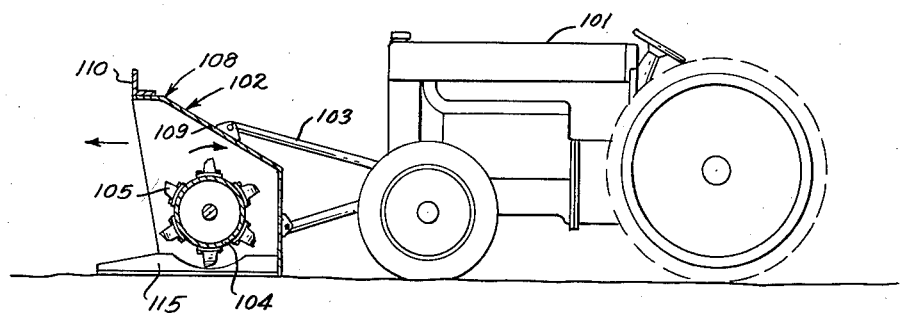
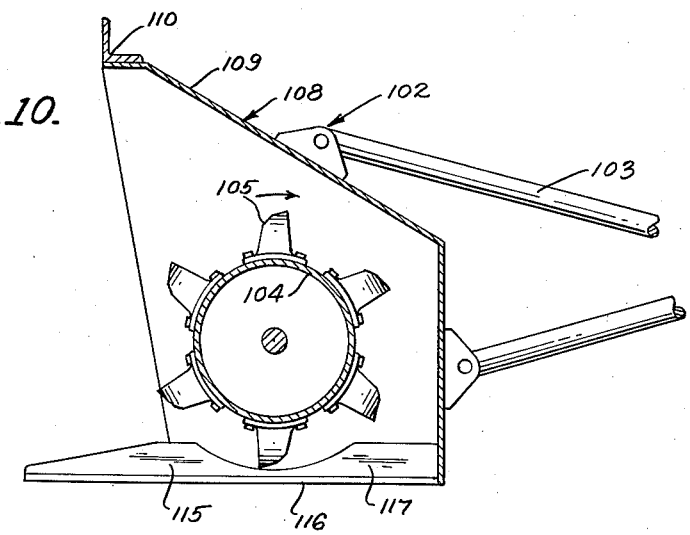
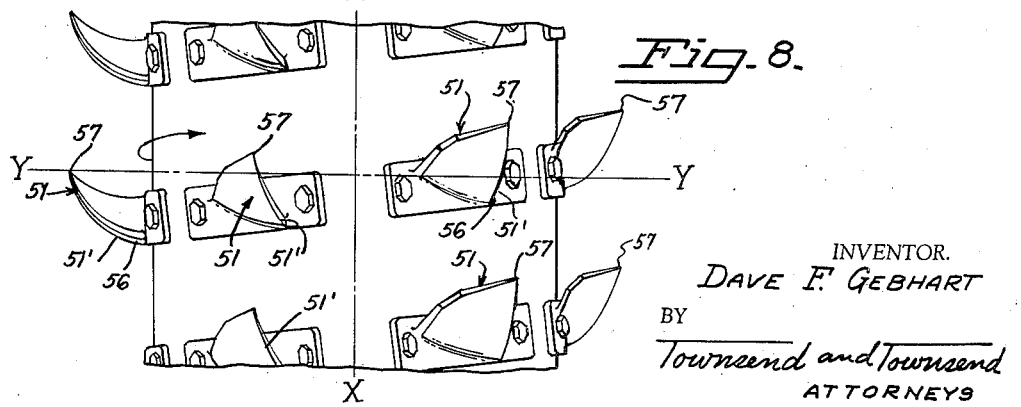

2,974,472
TRACTOR MOUNTED VEGETATION DISINTEGRATOR
Dave F. Gebhart, 334 Chamberlain Ave., Auburn, Calif.
Filed May 1, 1957, Ser. No. 656,741
4 Claims. (Cl. 56—504)

This invention relates to a rotary disintegrator for reducing wood cuttings, brush and the like and more particularly to an attachment which may be connected to a prime mover such as a tractor. Reference is made to my copending United States patent application Serial No. 565,831, filed February 16, 1956 (now abandoned) of which the present application is a continuation-in-part.

Clearing land of brush, grass and weeds is a general problem common to most all phases of agriculture. Orchard growers in particular have been faced with keeping the area between trees in an orchard area free from foreign growing matter and debris, such as brush, weeds and cuttings from trees occasioned by pruning. Small weeds may be plowed under or otherwise eliminated. Large debris interferes with successful plowing operations, and must either be reduced in size or removed prior to plowing. The usual procedure is to gather the larger debris and disposed of it by burning or the like.

The principal object of this invention is to provide a new and useful attachment powered and carried by a conventional tractor to assist in clearing of land areas.

Another object of the invention is to provide a pulverizing device which may be carried through an orchard area reducing various foreign matter to sufficiently small size to allow successful subsequent plowing operations.

A still further object of the invention is to provide a device having a drum with a plurality of radially extending projections arranged to co-act with woody debris with disintegrating impact to reduce said debris to smaller sized particles.

Still another object of the invention is to provide a device for clearing land of various combinations of surface growths and debris arranged to cut and reduce said growth and material and deposit residue back to the land, said action taking place by cutting teeth mounted in a generally spiral pattern on a rotating drum held a predetermined distance above the ground.

A further object is to provide a device of the character mentioned, safe in operation and use and provided with means to control the size of the residue pieces deposited back to the soil.

Another object is to provide an economic safe and efficient mechanism to disintegrate waste material in orchards, along roadsides and the like which has substantially greater power of disintegration and disposal than heretofore available.

Other objects of the present invention will become apparent upon reading the following specification and referring to the accompanying drawings in which similar characters of reference represent corresponding parts in each of the several views.

In the drawings:

Fig. 1 is an elevational view of a fragmentary part of a tractor with an embodiment of a disintegrator mounted to a linkage carried by the tractor showing a portion of the tractor broken away with the parts in the broken away portion shown in section.

Fig. 2 is a top plan view of Fig. 1.

Fig. 2A is a fragmentary rear elevation of the linkage connecting the disintegrator to the tractor.

Fig. 3 is an enlarged fragmentary sectional view of the embodiment of the disintegrator of Fig. 2 taken at line 3—3.

Fig. 4 is an enlarged elevational detailed view of a cutting tooth showing the tooth attached to a fragmentary portion of a cutting drum.

Fig. 5 is a plan view of the tooth of Fig. 4.

Fig. 6 is a front view of the tooth of Figs. 4 and 5.

Fig. 7 is a fragmentary top plan view of the revolving cutting drum employed in the disintegrator taken at line 7—7 of Fig. 3.

Fig. 8 is an enlarged fragmentary view of the drum and teeth mounted thereon with the longitudinal axis of the drum indicated by X—X and a plane perpendicular to the axis indicated by line Y—Y.

Fig. 9 is an elevational view of a second embodiment of the disintegrator shown mounted by a linkage on the front of a tractor.

Fig. 10 is an enlarged fragmentary view of Fig. 9.

The essence of this invention is to provide a grass, brush and debris disintegrator or cutter having a high speed revolving drum preferably supported from and powered by a prime mover such as a tractor and arranged with a plurality of blades extending radially therefrom. Each blade is formed in an arcuate cutting edge and arranged in a pattern so each blade in operation cuts upwardly within a radius overlapping a selected cutting radius of a preceding blade. The arc of the cutting edge of each blade is formed so that the blades each sequentially cut longitudinally of the drum on one section of the blade and radially of the drum at another section of the blade. The cutting drum is also provided with associated housing members for further improving the cutting efficiency of the device.

Referring now specifically to the drawings, blade carrying drum 33 is mounted within a housing A supported by a linkage B from the rear of tractor or prime mover C. Housing A has two flat parallel substantially vertical sides 12 and 13 supported by the terminal ends of transverse horizontal housing frame members 14, 15, 16 and 17, which may be in the form of angle bars or tubes. The top of the housing between sides 12 and 13 is covered by a flat cover plate 18 between frame members 14 and 15 and an arcuate cover plate 19 between frame members 15 and 16. Sides 12 and 13 and cover plates 18 and 19 enclose the moving mechanism in housing A for protection of personnel near the disintegrator.

Housing A is attached to linkage B by a support comprising two upwardly converging support members 23 and 24 fixed at spaced apart positions as at 23' and 24' respectively on frame member 14 and joined together at their upper ends at 21. Supporting members 23 and 24 are braced in a substantially upright position by downwardly, rearwardly inclined bracing arms 22 extending from about the midpoint of support members 23 and 24 to frame member 15 intermediate the ends thereof.

One means of suspending housing A from tractor C is herein illustrated, it being understood that other means of suspension may be employed. As shown in the drawing, tractor C is provided with a rearwardly extending top linkage 26 pivoted at its forward end at the rear of the tractor and at its rearward end to juncture 21 of members 23 and 24. Under top link 26 are two lower links 28 pivoted at their forward ends 27' to the differential 27 of the tractor and at their rearward ends 28' to a midpoint position of members 23 and 24. Links 28 are pivotally connected by arms 29 and 29' to a hydraulic mechanism 25 to raise or lower the linkage B upon actuation of the hydraulic mechanism. In this arrangement when linkage B is raised members 23 and 24 are caused to remain in a substantially vertical alignment.

Top link 26, lower link 28 and connecting arm 29 are commonly provided on tractors for mounting various implements and accessories to the tractors, such as plows, mowers and the like. An illustrative example of such a linkage is shown at page 989 of Dyke's Automobile and Gasoline Encyclopedia, 20th edition, published by the Goodheart-Willcox Company, Inc.

Housing A is mounted to one side of its longitudinal center so that one side of the housing extends laterally from the tractor a greater distance than the other. The off-center placement of housing A allows greater manoeuverability for operation along roadsides, in orchards, and in other difficult areas.

A power-take off shaft 31, conventionally under differential 27 of the tractor is employed to rotate substantially horizontal transversely disposed ground cover cutting drum 33, rotatable within hopper body A on a shaft 34. Shaft 34 is supported by a pair of bearings 35 carried by sides 12 and 13. A telescopically expandable shaft 36 is provided with universal joints 37 at each end to form a flexible power transmitting connection from the power-take off shaft 31 to a bevel-drive gear 38. Bevel drive gear 38 is mounted within a gear box 40 and is disposed to drive a bevel driven gear 39. The driven gear 39 is fixed to a horizontal transverse axle 41 rotatably mounted in bearings 42 carried by sides 12 and 13. The gear ratio between gears 38 and 39 is arranged to increase speed of rotation of axle 41 over the speed of rotation of take off shaft 31.

Two pulleys 45 journalled on each end of shaft 41 and two pulleys 46 journalled on each end of shaft 34 are connected by belts 47 all external to sides 12 and 13. Thus power is transmitted from the tractor through power take off shaft 31 to gearbox 40, thence to axle 41 and via belt 47 to drum 33.

In the conventional tractor system the power take off shaft rotates in a direction which, with the mechanism hereinbefore described, will cause the drum to rotate in a direction opposite that which the tractor wheels are turning. By rotating the drum in this direction cutting blades 51 on the drum are arranged to cut upwardly on the leading side of the drum. Should a tractor be provided with a power take off gear rotating in an opposite direction, reverse gears known to those familiar with the art can be employed to rotate drum 33 in a direction opposite to that of the tractor wheel.

Teeth 51 are mounted in a helical pattern about the circumference of the drum 33 so that during rotation of the drum each succeeding tooth with respect to the material to be worked is progressively further toward the end of the drum indicated at 60 in Fig. 7 and further from the end indicated at 60'. Each tooth is provided with a leading, wood gouging or cutting edge 51' formed in a substantially arcuate configuration and has a root portion angularly related to a base portion 56 of the cutting edge adjacent the circumference of the drum and tip portion 57 adjacent the outermost tip of the blade. The tip portions of the blades are arranged to point in a common direction toward end 60 of the drum. The profile of the tooth in side elevation as viewed in Fig. 4 defines a geometric shape including the cutting edge 51' formed to project substantially radially outwardly from the circumference of the drum, the tooth being further defined in profile, as viewed in Fig. 6, in front elevation as having the cutting edge 51' being formed in a substantially arcuate line from base portion 56 to tip portion 57. The arcuate line of the cutting edge 51' includes both longitudinally and radial components relative to the drum throughout both the base portion 56 and the tip portion 57. It will be observed that due to the longitudinal complement of the cutting edge 51' that the base portion and tip portions are each arranged to travel in different parallel planes during rotation of the drum. Due to the helical arrangement of the blades on the drum the blades are offset one from the other in such a manner that the base portion 56 of one blade is arranged to travel in the same plane as the tip portion of the next adjacent blade in the helical path. Thus the planes or path of travel of each blade are overlapped by the base portion 56 of the adjacent preceding blade and tip portion 57 of the adjacent succeeding blade in the helical path.

It is noted that with the blades formed in the configuration and position as hereinbefore set forth that the base portion 56 of the cutting edge 51' effectively moves upstanding twigs and the like into the direct path of travel of the next succeeding tooth. By this means the twig, engaged but not severed by one blade, is positioned so the tip portion 57 of the next succeeding tooth is aligned to directly cut the twig. In this novel configuration of the teeth it is noted that the blades are arranged to cut at various compound angles and are further arranged to cam or direct unsevered upstanding work material into the path of the next succeeding blades so the blade strikes the work at an angle calculated to more efficiently cut the material.

Comb fingers 65 are mounted projecting forwardly from frame member 17 pointing toward drum 33, and are spaced from drum 33 to provide clearance between fingers 65 and teeth 51. The comb fingers prevent large particles from passing around the drum so they can be held for further disintegration by the teeth. In addition, the comb fingers also provide a means to prevent any matter from wrapping around the drum 33 and thus function as a stripper. The fingers function as a stripper due to the relative close spacing between the top face of the comb fingers and the tip portion of the teeth. Adjacent each comb finger 65 is a removable fork 61 held to frame member 17 by bolts 66. Each fork is disposed extending downwardly from frame member 17 to catch loose brush and the like upon movement of the disintegrator over the earth's surface and to bring smaller articles into contact with the teeth on the drum.

A rear baffle plate 67 made of an arcuate configuration similar to the curvature of the radius of drum 33 is mounted on frame member 17 rearwardly of the drum between sides 12 and 13. An adjustable gate 68 is hinged to frame member 16 on axle 68' and swingable to regulate the area of opening between baffle plate 67 and the lower edge of gate 68. The gate 68 is locked in position by a locking device 69 mounted on the upper portion of the gate and engageable with slots 70 carried by a bracket plate 71 mounted on housing A. The rear plate 67 provides a baffle by which material not ejected through the opening above the plate is directed downwardly to proximity to drum 33.

In the field, the device may be attached to a tractor C, as shown by Figs. 1, 2 and 2a of the accompanying drawings. By virtue of the hydraulic system controlled by cylinder 25 of the tractor, housing A can be raised or lowered at the control of the operator. In the case of operating with relatively unsubstantial ground cover, such as grass and the like, it is desirable to have the disintegrator relatively close to the ground in which case forks 61 are removed to allow the housing to ride in close proximity to the ground. While cutting heavier items, such as sagebrush and the like, it is desirable to have the disintegrator mounted some distance above the ground and forks 61 are attached to pick up smaller articles near the ground.

As the tractor moves in the forward direction drum 33 is rotated in a direction opposite the tractor wheels by the drive interconnection with take off shaft 31. Drum 33 is geared to rotate at a high rate of speed which causes teeth 51 to have a high cutting and disintegrating impact against woody and fibrous substances. Some of the ground covering materials are parted or separated by the teeth of the disintegrators and left to fall by gravity. Other portions of the material being acted upon are carried around by drum 33 and by inertia are carried out the opening in the rear of disintegrator between gate 68 and plate 67. The remaining material, however, will pass between plate 67 and drum 33 wherein the material will be more completely acted upon by the oncoming teeth 51 to cause a more complete disintegration of the debris thus held. The final product is a multitude of small particles deposited upon the ground.

When gate 68 is fully opened the greater part of the material passes out of the rear of the device. However, upon closing of the gate more material is held within the housing to be more completely disintegrated, thus, the final particle size is determined by the position of gate 68.

Forks 61 pick up material which otherwise may be passed over and act to bring such material into contact with the teeth. When cutting brush and the like the forks either ride on the ground or just above the ground. It is to be noted that when the forks ride on the ground there is additional support provided for housing A to augment linkage B. The spiral arrangement and shape of the teeth provide ground cover engaging surface along the surface area off drum 33. Thus at some time during the revolving cycle of the drum a tooth is enabled to contact the ground cover to insure uniform clearing of the ground surface.

With this mechanism it is possible to cut and disintegrate various types of woody or grasslike ground cover leaving same on the ground to add to the fertilization of the soil and pulverized to such an extent that it is unnecessary to either remove the items for appearance or for purposes of plowing or other ground cultivation.

Control of particle size is provided by adjusting the heighth that the device travels above the ground and controlling the opening on the rear of the disintegrator by utilization of gate 68.

Referring now specifically to Figs. 9 and 10 there is provided a second embodiment of the invention wherein a prime mover such as a tractor 101 is provided with a disintegrating apparatus 102 mounted forward of the tractor. Conventional linkage means 103 such as described in Figs. 1 and 2, but adapted for forward mounting on the prime mover, is provided to raise and lower the disintegrating apparatus 102 from the driver's seat on tractor 101.

The disintegrating device 102 comprises a rotatably mounted drum 104 powered by a suitable drive means, such as for example shown in Figs. 1 and 2, and arranged to rotate the drum in the proper direction so the forward or leading edge of the drum is arranged to move upwardly when the tractor is moving forwardly. Drum 104 is provided with teeth 105 constructed in the same shape and arranged in the same helix pattern as hereinbefore described in connection with Figs. 4, 5, 6, 7 and 8.

The drum is supported from a housing 108 formed with a top portion 109 projecting forwardly of the drum and having a reinforced leading edge 110. Guide fingers 115 are provided under the drum in parallel spaced relation with sufficient clearance below the drum to provide clearance for teeth 105. Each guide finger is formed in an inverted T in cross-section wherein the bottom edge 116 of guide finger 115 is substantially in coplanar relation to the ground surface and the upwardly projecting edge 117 is normal to the ground surface.

In operation prime mover 101 is forwardly moved and drum 104 is rotated with the cutting edge of teeth 105 on the forward side of the drum arranged to cut upwardly against the work. The reinforced leading edge of housing 108 functions to bend upstanding shrubs, twigs and the like downwardly so that blades 105 may attack the work material while urged downwardly by leading edge 110. This holds upstanding branches in position thus reducing the tendency of flexible work to be deflected rather than cut by the blades. By this means a more solid cutting engagement of the teeth and taller work material is obtained.

Fingers 115 are arranged to ride slightly above the ground surface. Should a rock or irregular ground surface be in the path of the disintegrator during forward movement. Fingers 115 would first contact the obstruction and translate the condition to the operator of the tractor. The operator could raise the disintegrator to clear the obstruction in time to prevent the teeth of the drum from being damaged. The fingers are also arranged to slide under vertical work material lying on the ground and bring such material upwardly along the top edge of the finger into engagement with the cutting teeth 105 of the drum.

Rotating the drum so the forward or cutting side travels relatively upward, has the advantage of deflecting severed brush upwardly and away from the drum rather than downwardly and under the drum wherein if the drum rotation were reversed there would be a tendency for an accumulation of partially cut brush to mass between the bottom of the drum and the ground.

Although the foregoing invention has been described in some detail by way of illustration and example for purposes of clarity of understanding, it is understood that certain changes and modifications may be practiced within the spirit of the invention and scope of the appended claims.

What is claimed is:

1. In a ground clearing device of the class wherein a prime mover is associated with and imparts ground-traversing movement to a housing having an open front and bottom, with said bottom supported adjacent to the ground and carrying parallel fork members, the combination with said housing of a drum, means for rotatably mounting the drum in said housing and means for imparting rotation to said drum, a series of cutting blades carried on and in axially spaced relation with respect to and circumferentially of said drum and offstanding radially from the periphery thereof, said cutting blades each having a root portion and base portion secured to the drum, and a cutting edge terminating at said root portion and also extending diagonally of said base portion, the axial spacing of said blades being such that upon rotation of said drum the cutting edges of the several blades will traverse intersecting paths.

2. In a ground clearing device of the class wherein a prime mover is associated with and imparts ground-traversing movement to a housing having an open front and bottom, with said bottom supported adjacent to the ground and carrying parallel fork members, the combination with said housing of a drum, means for rotatably mounting the drum in said housing and means for imparting rotation to said drum, a series of cutting blades carried on and in axially spaced relation with respect to and circumferentially of said drum and offstanding radially from the periphery thereof, said cutting blades each having a base portion secured to the drum, a root portion substantially spanning the base portion diagonally thereof, and a cutting edge terminating at said root portion and also extending diagonally of said base portion, the axial spacing of said blades being such that upon rotation of said drum the cutting edges of the several blades will traverse intersecting paths.

3. In a ground clearing device as claimed in claim 1, wherein the axial spacing and circumferential arrangement of said cutting blades forms a spiral with respect to the periphery of said drum.

4. In a ground clearing device as claimed in claim 1, in which each of said blades has its cutting edges terminating in a tip offstanding axially of said drum and a trailing edge extending from said tip to its root portion, the tip of the cutting edge of each of said blades serving during rotation of said drum to traverse a path which intersects the junction of the trailing edge of another blade with that root portion of said other blade.

References Cited in the file of this patent

UNITED STATES PATENTS

| | | |
|---|---|---|
| 1,648,341 | Goble | Nov. 8, 1927 |
| 1,657,682 | McClearen | Jan. 31, 1928 |
| 2,679,200 | Johnson et al. | May 25, 1954 |
| 2,680,337 | Whipple | June 8, 1954 |
| 2,787,943 | Browning | Apr. 9, 1957 |